(12) United States Patent
Diego Andilla et al.

(10) Patent No.: US 11,908,142 B2
(45) Date of Patent: *Feb. 20, 2024

(54) METHOD, ARTIFICIAL NEURAL NETWORK, DEVICE, COMPUTER PROGRAM, AND MACHINE-READABLE MEMORY MEDIUM FOR THE SEMANTIC SEGMENTATION OF IMAGE DATA

(71) Applicant: Robert Bosch GmbH, Stuttgart (DE)

(72) Inventors: Ferran Diego Andilla, Barcelona (ES); Dimitrios Bariamis, Hildesheim (DE); Masato Takami, Hildesheim (DE); Uwe Brosch, Algermissen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 317 days.

This patent is subject to a terminal disclaimer.

(21) Appl. No.: 17/282,372

(22) PCT Filed: Sep. 26, 2019

(86) PCT No.: PCT/EP2019/076032
§ 371 (c)(1),
(2) Date: Apr. 1, 2021

(87) PCT Pub. No.: WO2020/069964
PCT Pub. Date: Apr. 9, 2020

(65) Prior Publication Data
US 2021/0343019 A1    Nov. 4, 2021

(30) Foreign Application Priority Data

Oct. 5, 2018   (DE) ................... 10 2018 217 092.4

(51) Int. Cl.
G06T 7/11        (2017.01)
G06N 3/045       (2023.01)

(52) U.S. Cl.
CPC ............... *G06T 7/11* (2017.01); *G06N 3/045* (2023.01); *G06T 2207/20084* (2013.01)

(58) Field of Classification Search
CPC . G06T 7/11; G06T 2207/20084; G06N 3/045; G06N 3/084
See application file for complete search history.

(56) References Cited

U.S. PATENT DOCUMENTS 11,113,561 B2 *  9/2021  Diego Andilla .... G06F 18/2451
2020/0110960 A1 *  4/2020  Andilla ..................... G06N 3/08
(Continued)

OTHER PUBLICATIONS

Zhang, et al.: "Split-Brain Autoencoders: Unsupervised Learning by Cross-Channel Prediction", Bair, University of aalifomia, (2017), arXiv:1611.09842v3, pp. 1-11.
(Continued)

*Primary Examiner* — Bobbak Safaipour
(74) *Attorney, Agent, or Firm* — NORTON ROSE FULBRIGHT US LLP; Gerard A. Messina

(57) ABSTRACT

A method for the computing and memory resource-conserving semantic segmentation of image data of an imaging sensor with the aid of an artificial neural network, in particular, a convolutional neural network, the artificial neural network including an encoder path and a decoder path. The method includes: dividing an input tensor into at least one first slice tensor and at least one second slice tensor as a function of a division function, the input tensor being dependent on the image data; outputting the at least one first slice tensor to the decoder path of the neural network; connecting the at least one first slice tensor to the at least one second slice tensor as a function of a connecting function to obtain an output tensor; and outputting the output tensor to the encoder path of the artificial neural network.

11 Claims, 5 Drawing Sheets

(56) References Cited

U.S. PATENT DOCUMENTS

| | | | | |
|---|---|---|---|---|
| 2023/0097417 A1* | 3/2023 | Lyu | ........................ | G06T 11/006 |
| | | | | 382/131 |
| 2023/0153601 A1* | 5/2023 | Fukuda | ................... | G06N 3/084 |
| | | | | 706/15 |
| 2023/0156341 A1* | 5/2023 | Kato | ....................... | H04N 25/40 |
| | | | | 348/148 |

OTHER PUBLICATIONS

International Search Report for PCT/EP2019/076032 dated Jan. 29, 2020.

Jindong Jiang et al. "REdNet: Residual Encoder-Decoder Netwrok for indoor RGB-D Semantic Segmentation" arxiv.org. Cornell University Library, 201 Olin Library Cornell University Ithaca, NY 14853. Jun. 4, 2018. XP08112198. 23 Pages.

Tran Minh Quan et al. "FusionNet: A deep fully residual convolutional neural network for image segmentation in connectomics" Dec. 15, 2016. Retrieved from the Internet on Apr. 1, 2021: https://arxiv.org/ftp/arxiv/papers/1612/1612.05360.pdf. 10 Papges.

Evan Shelhamer et al. "Fully Convolutionl Networks for Semantic Segmentation." PAMI (May 2016). Retrieved from the Internet on Apr. 1, 2021: https://arxiv.org/abs/1605.06211. 12 Pages.

Olaf Ronneberger et al. "U-Net: Convolutional Models for Semantic Segmentation." Medical Image Computing and Computer-Assisted Intervention (MICCAI), Springer, LNCS, vol. 9351. Retrieved from the Internet on Apr. 1, 2021: https://arxiv.org/pdf/1505.04597.pdf. 8 Pages.

Szegedy et al., "Going deeper with convolutions," in Proceedings of the IEEE Conference on Computer Vision and Pattern Recognition, pp. 1-12, 2015.

* cited by examiner

METHOD, ARTIFICIAL NEURAL NETWORK, DEVICE, COMPUTER PROGRAM, AND MACHINE-READABLE MEMORY MEDIUM FOR THE SEMANTIC SEGMENTATION OF IMAGE DATA

BACKGROUND INFORMATION

Evan Shelhamer, Jonathan Long, Trevor Darrell, "Fully Convolutional Models for Semantic Segmentation," PAMI 2016. describes a refinement of convolutional neural networks. Convolutional neural networks are powerful artificial neural networks for processing visual data, which are able to produce a semantic feature hierarchy of the visual data. This paper describes the approach of using a "fully convolutional network" which is able to take input data of an arbitrary size and produce a correspondingly-sized output with efficient derivation of the features.

Olaf Ronneberger, Philipp Fischer, Thomas Brox, "U-Net: Convolutional Networks for Biomedical Image Segmentation. Medical Image Computing and Computer-Assisted Intervention (MICCAI)," Springer, LNCS, Vol. 9351 describes an architecture of an artificial neural network and a training strategy for this network, which is based on the use of expanded (augmented) training data to utilize the available annotated samples more efficiently. The architecture of the network encompasses a "contracting path" (encoder path) to detect the context of the input data and, symmetrically thereto, an "expanding path" (decoder path), which enables a precise localization of the detected context. This artificial neural network may be trained using a comparatively low number of training data.

SUMMARY

Artificial neural networks, in particular, so-called convolutional neural networks (CNN), for semantic segmentation, in particular, for localization and classification of features in image data, have a high demand for computing resources. By adding a decoder or upsampling component and a connecting component (skip component) by which, following the semantic analysis in the encoder component, the image data may be restored up to the original resolution, the demand for computing resources further increases drastically. In some implementations, this may result in an exponential increase in the computing resources.

In addition to the increase in the computing resources, a pixel-based semantic segmentation of image data during the use of artificial neural networks, in particular, during the use of CNN, requires more memory resources, i.e., more memory bandwidth, memory access and memory space during the training phase and the use of the network.

The disadvantage of this additional demand for computing and memory resources is amplified as soon as the application does not occur on special processing units which have powerful memories and compute in a distributed manner, such as graphical processing unit (GPU) clusters, but is to run on embedded processing units, such as embedded hardware or the like.

The present invention provides a method, an artificial neural network, a device, a computer program, and a machine-readable memory medium for semantic segmentation of image data of an imaging sensor.

In the present example, image data may be understood to mean data of an imaging sensor. This shall primarily be understood to mean the data of a video sensor, therefore of a camera. Due to the similarity of the data, it is also possible to process data of a radar, an ultrasonic, a LIDAR sensor or the like as image data with the aid of the present invention. As a result, radar, ultrasonic, LIDAR sensors or the like may be understood as imaging sensors with respect to the present invention.

Of particular significance for the present invention are image data of an imaging sensor, or the like, suitable for the use in a vehicle, therefore an automotive image sensor.

In the present example, semantic segmentation shall be understood to mean the processing of image data with the goal of ascertaining both the semantic classes of the objects included in the image and their localization in the image. In the process, it must be taken into consideration that global pieces of information in the image allow conclusions to be drawn on the semantic class of the objects, while local information in the image allows conclusions to be drawn on the localization of the objects in the image.

One aspect of the present invention is a method for semantic segmentation of image data with the aid of an artificial neural network, in particular of a convolutional neural network (CNN). The artificial neural network includes an encoder path for ascertaining the semantic classes in the image data and a decoder path for localizing the ascertained classes in the image data. In accordance with an example embodiment of the present invention, the method includes the steps:

dividing an input tensor into at least one first slice tensor and at least one second slice tensor as a function of a division function, the input tensor being dependent on the image data;

outputting the at least one first slice tensor to the decoder path of the artificial neural network;

connecting the at least one first slice tensor to the at least one second slice tensor as a function of a connecting function to obtain an output tensor; and outputting the output tensor to the encoder path of the artificial neural network.

In the present example, an artificial neural network shall be understood to mean a network made up of artificial neurons for information processing, for example for semantic segmentation of image data, in particular, for the localization and classification of features in image data.

In the present example, a convolutional neural network (CNN) shall be understood to mean a class of artificial neural networks which are considered "state of the art" in the area of the classification. The fundamental design of a CNN is made up of an arbitrary sequence of convolutional layers and pooling layers, which are terminated by one or multiple fully connected layer(s). The respective layers are constructed of artificial neurons.

In the present example, an encoder path shall be understood to mean the path of the processing of the image data up to the classification of features, such as for example objects, in the image data.

In the present example, a decoder path shall be understood to mean the path which follows the encoder path and, proceeding from the classification, restores the original image data for the localization of the classified features.

In the present example, a connecting component shall be understood to mean an architecture component in a semantically segmented artificial neural network, which provides pieces of information from the encoder path to a corresponding location of the decoder path. Connecting components appear as skip connections or as skip modules.

In the present example, a tensor shall be understood to mean a data representation during the processing in an artificial neural network. The data set encompasses a processed status of the image data and associated feature maps. A tensor of the i-th step in the artificial neural network is typically represented as $x_i \in R^{n \times m \times f}$ with n rows, m columns, and f feature maps.

An input tensor is a data representation prior to the processing by the method of the present invention.

A slice tensor is a data representation after the step of dividing according to the method of the present invention.

An output tensor is a data representation for the further processing on the encoder path of the artificial neural network.

In the present example, a division function may be understood to mean any function which is suitable for selecting a suitable set from the input tensor and the set of the associated feature maps. This may take place according to division factors, according to indices or the like.

In the present example, a connecting function may be understood to mean any function which is suitable for connecting the at least one first slice tensor to the at least one second slice tensor. This may take place by concatenation, summation, substitution, reproduction or the like.

An advantage of the method in accordance with an example embodiment of the present invention is in the step of dividing. As a result of this step, it is possible to achieve an exact semantic segmentation of the image data and, at the same time, minimize the necessary computing resources and the necessary memory resources by optimally utilizing the computations which are carried out in the encoder path.

This allows the method of the present invention to be carried out on embedded processing units (so-called embedded hardware), which are typically used in the automotive environment.

According to one specific embodiment of the method of the present invention, the division function in the step of dividing is configured in such a way that only a subset of the feature maps of the input tensor is selected for forming the at least one first slice tensor.

In the present example, a feature map shall be understood to mean the output of a layer of an artificial neural network. A CNN is typically the result of the processing by a convolutional layer, followed by the associated pooling layer, and may serve as input data for the subsequent layer or, if provided, the fully connected layer.

According to one specific embodiment of the method of the present invention, the merge function in the step of connecting is configured in such a way that the dimension of the input tensor is maintained.

This specific embodiment of the present invention may have the advantage that, with respect to the computing resources to be employed, it is possible to continue to use pieces of information from various layers of the artificial neural network, in particular, of the convolutional neural network (CNN) by employing fewer resources, and thus more cost-effectively.

According to one specific embodiment of the method of the present invention, the method includes the preceding step of receiving, the input tensor and the division function being received in the step of receiving.

This specific embodiment of the method may have the advantage that, at lower costs, the artificial neural network is more flexible compared to a parallel implementation of a conventional artificial neural network, and is able to respond to the respective input tensors in a more fine-grained manner on the respective layers.

According to one specific embodiment of the method of the present invention, a first function of an artificial neural network is applied, in the step of dividing, to the at least one first slice tensor, and a second function of an artificial neural network is applied to the at least one second slice tensor.

In the present example, a function of an artificial neural network may be understood to mean an arbitrary function of a neuron layer of an artificial neural network. This may be convolution, also in the form of a convolutional block, i.e., a multiple application of convolutions, depth-wise convolution, squeeze, residual value (residual), density (dense), inception, activation (act), normalization, compilation (pooling) or the like.

In the present example, inception is an architecture variation of an artificial neural network, in particular, of a convolutional neural network, as it was first described in Szegedy et al., "Going deeper with convolutions," in Proceedings of the IEEE Conference on Computer Vision and Pattern Recognition, pp. 1-9, 2015.

According to one specific embodiment of the method of the present invention, the division function in the step of dividing is configured in such a way that the division function encompasses the number of feature maps to be computed, and the respective functions of an artificial neural network or computation graphs for computing the at least one first slice tensor and the at least one second slice tensor.

This specific embodiment of the method of the present invention has the advantage that different functions of an artificial neural network may be applied in a simple manner to the at least one first slice tensor and the at least one second slice tensor. As a result, the artificial neural network becomes more flexible, at lower costs, compared to a parallel implementation of a conventional artificial neural network, and the artificial neural network is able to respond to the respective input tensors in a more fine-grained manner.

A further aspect of the present invention is an artificial neural network for semantic segmentation of image data, the artificial neural network including an encoder path for classifying the image data, and a decoder path for localizing the image data, and is configured to carry out steps of the method according to the present invention.

An artificial neural network thus configured is preferably used in a technical system, in particular, in a robot, a vehicle, a tool or a machine tool, to determine output variables as a function of input variables. Sensor data or variables which are dependent on sensor data may be used as input variables of the artificial neural network. The sensor data may stem from sensors of the technical system or be received by the technical systems from the outside. Depending on the output variables of the artificial neural network, at least one actuator of the technical system is activated with the aid of an activation signal by a control unit of the technical system. In this way, for example, it is possible to control a movement of a robot or vehicle, or a tool or a machine tool may be activated.

In one specific embodiment of the artificial neural network according to the present invention, the artificial neural network may be configured as a convolutional neural network.

A further aspect of the present invention is a device which is configured to execute steps of the method according to the present invention.

A further aspect of the present invention is a computer program which is configured to execute steps of the method according to the present invention.

A further aspect of the present invention is a machine-readable memory medium on which the artificial neural network according to the present invention, or the computer program according to the present invention, is stored.

Details and specific example embodiments of the present invention are explained in greater detail hereafter based on multiple figures.

DETAILED DESCRIPTION OF EXAMPLE EMBODIMENTS

Figure 1:
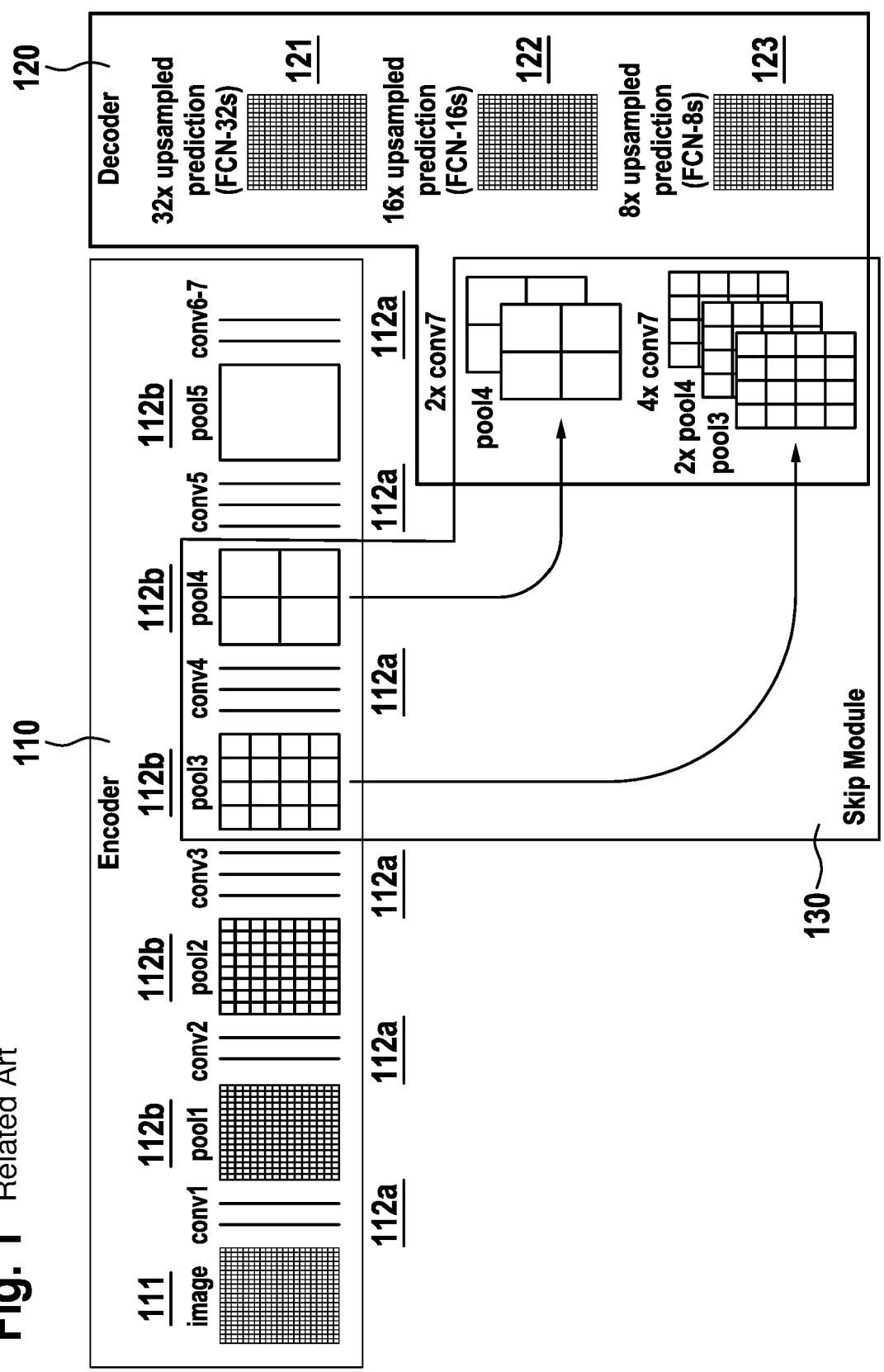
FIG. 1 shows a block diagram of a fully convolutional network from the related art.

FIG. 1 shows a block diagram of a fully convolutional network from Evan Shelhamer, Jonathan Long, Trevor Darrell, "Fully Convolutional Models for Semantic Segmentation," PAMI 2016."

The figure summarizes portions of the illustrated course in an artificial neural network in blocks.

In block encoder 110, the processing steps, proceeding from image data as input data 111, across multiple layers of a convolutional neural network (CNN) are shown. Convolutional layer 112a and pooling layer 112b may be clearly derived from the figure.

In block decoder 120, "deconvoluted" results 121, 122, 123 of the CNN are shown. Deconvolution may be achieved in the process by the reversal of the convolution steps. In the process, it is possible to map the coarse-grained classification result on the original image data to thereby achieve a localization of the classified features.

In block skip module 130, connections of higher-level classification intermediate results of the CNN for the "deconvoluted" results are shown. In row 2, the intermediate results of the 4th pool have been linked to final results 122, and in row 3, the intermediate results of the 3rd and 4th pools have been linked to final results 123.

The advantage of these links is the option of determining finer details and, at the same time, obtaining higher-level semantic information.

Figure 2:
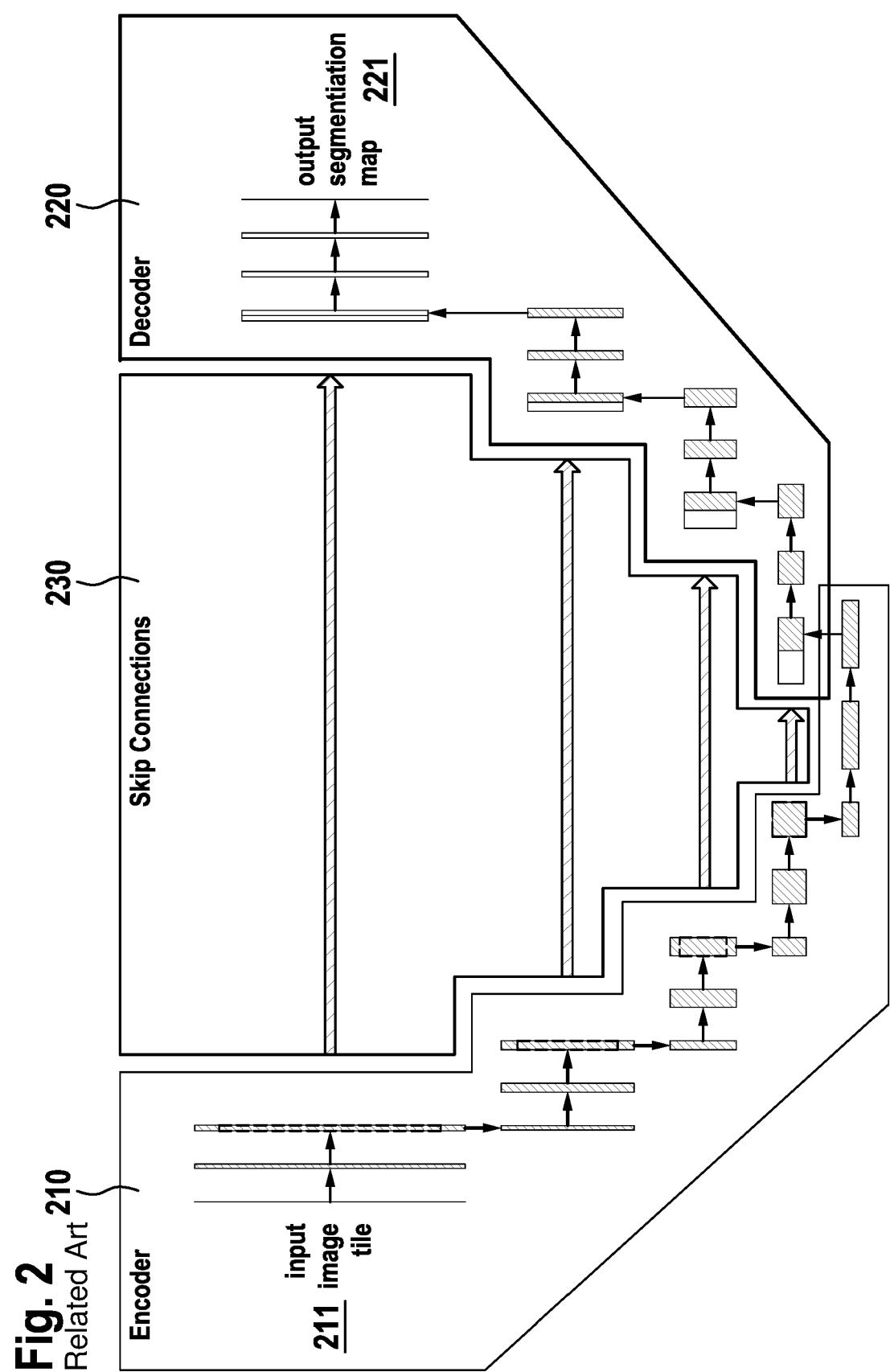
FIG. 2 shows a block diagram of the U-Net architecture of a convolutional network from the related art.

FIG. 2 shows a block diagram of the U-Net architecture of a convolutional network from Olaf Ronneberger, Philipp Fischer, Thomas Brox, "U-Net: Convolutional Networks for Biomedical Image Segmentation," Medical Image Computing and Computer-Assisted Intervention (MICCAI), Springer, LNCS, Vol. 9351.

In block encoder 210, the processing steps, proceeding from image data as input data 211, across multiple layers of a convolutional neural network (CNN) for the classification of input data 211 are shown.

In block decoder 220, the "deconvolution steps (upconvolution)," proceeding from the deepest classification level, across a corresponding number of deconvolutional layers to a semantically segmented map 221 including localized and classified features of input data 211 are shown.

In block 230, connections (skip connections) between the layers of block encoder 210 and the corresponding layers of block decoder 220 are shown. These connections represent the flow of information in the artificial neural network between the classification task and the localization task. In addition, it is possible to reconcile coarse-grained semantic segmentation with a higher degree of the restoration of the input data.

Figure 3:
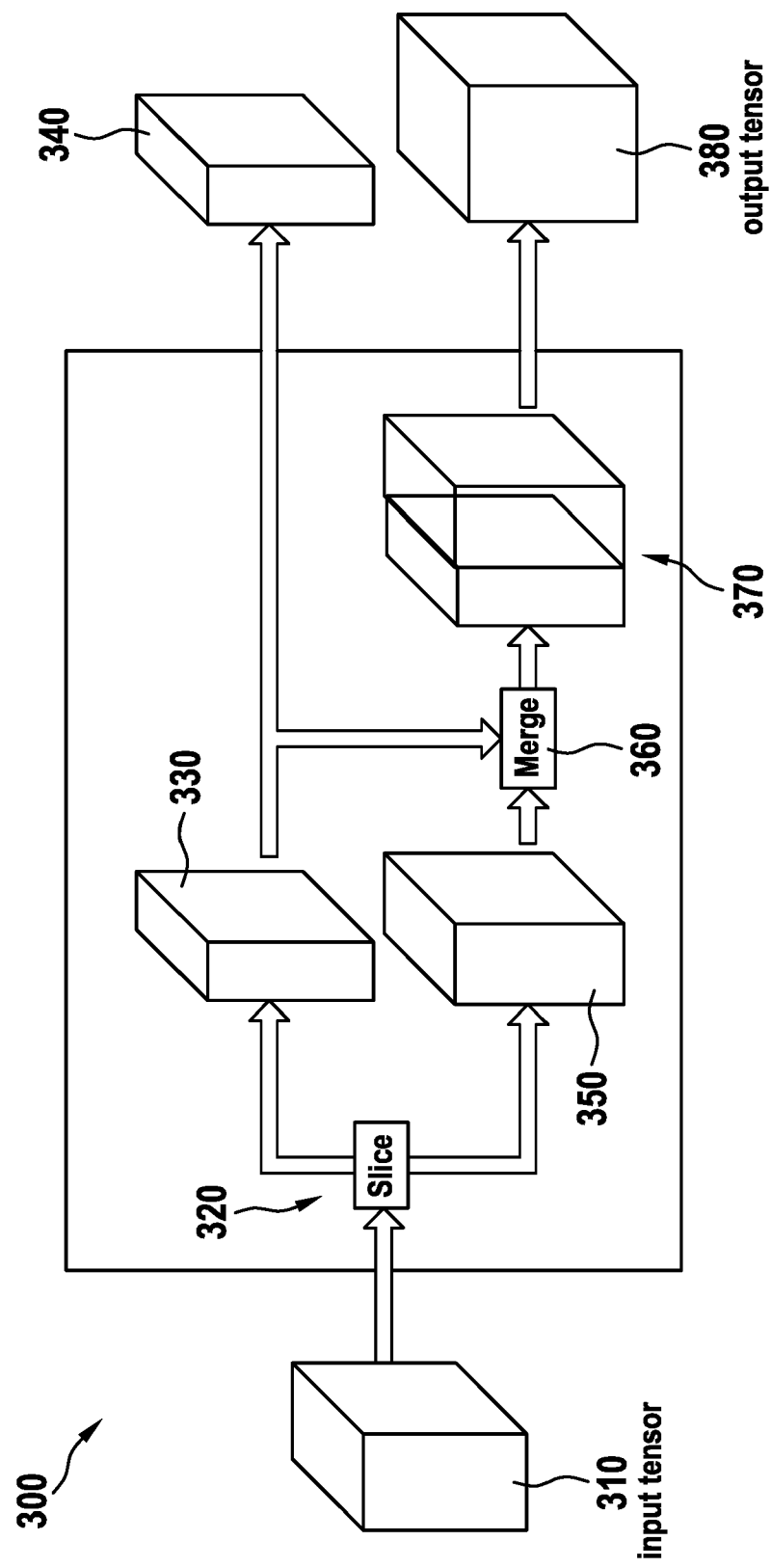
FIG. 3 shows a block diagram of a portion of one specific example embodiment of an artificial neural network according to the present invention.

FIG. 3 shows a block diagram of a portion of one specific embodiment of an artificial neural network according to the present invention. According to this specific embodiment, the artificial neural network or the method according to the present invention is operated in a so-called "tensor mode."

In the present example, an input tensor $x_i \in R^{n \times m \times f}$ 310 is shown, having a number of rows n, a number of columns m and a number of feature maps f, in the i-th step of an artificial neural network. Furthermore, a division function (slide) 320 is present. The input tensor is divided into at least one first slice tensor 330 and into at least one second slice tensor 350 according to division function (slice) 320. In the process, the division may take place according to an arbitrary division function (slice) 320. A division according to division factors (splitting factor), according to indices or the like, among other things, is possible.

The at least one first slice tensor 330 is provided to be supplied to decoder path 340 of the artificial neural network, in order to be linked there with coarse, abstract feature representations.

The at least one second slice tensor 350, together with the at least one first slice tensor 330, is supplied to a connecting function (merge) 360 to generate an output tensor 370. Any rule which is suitable for connecting first slice tensor 320 to second slice tensor 350 may be applied as a connecting function (merge) 360. Concatenation, summation, substitution, replication or the like are, among others, possible. Output tensor 370 is provided to be processed further along encoder path 380 by the artificial neural network.

Figure 4:
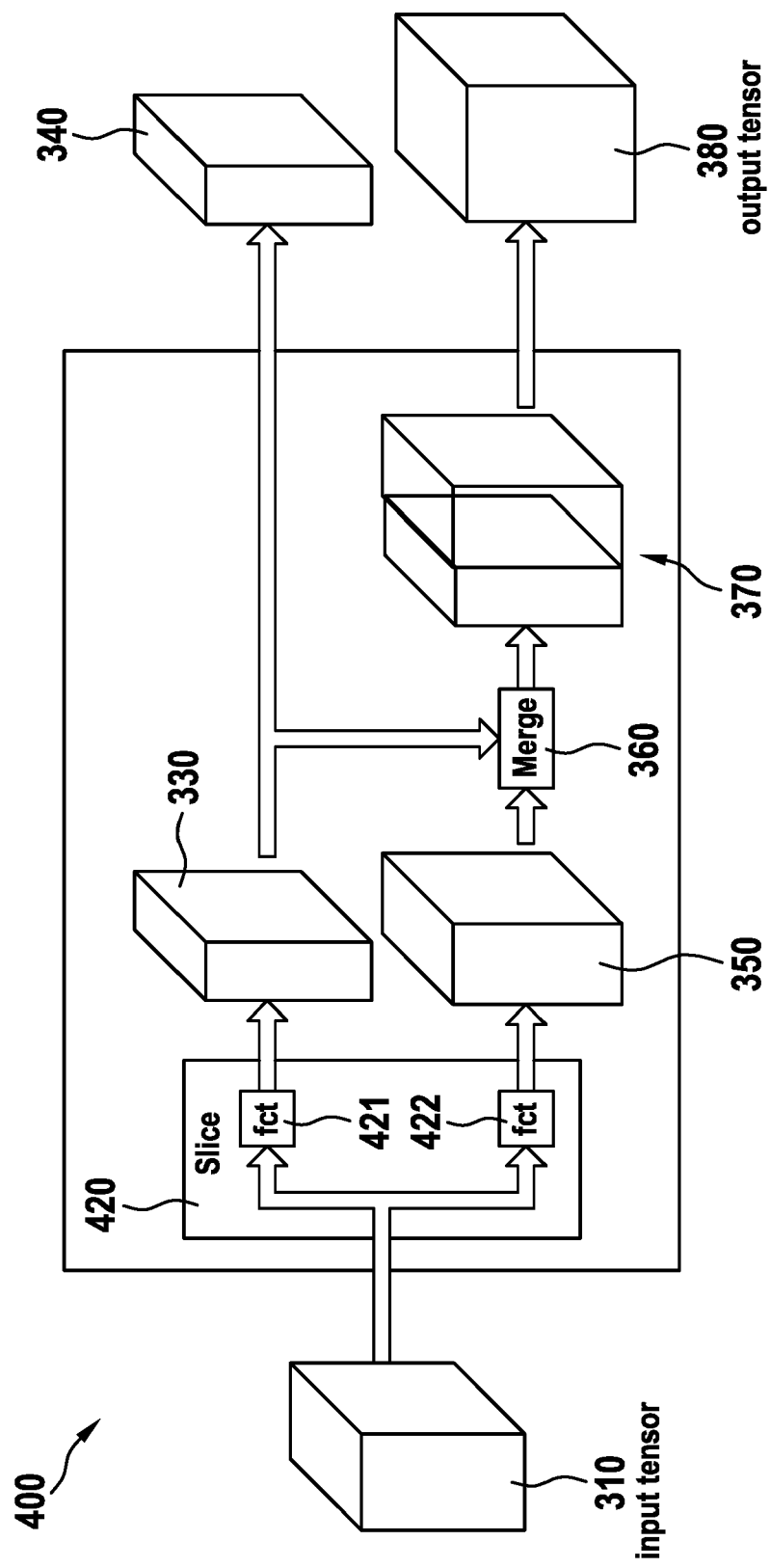
FIG. 4 shows a block diagram of a portion of one further specific example embodiment of an artificial neural network according to the present invention.

FIG. 4 shows a block diagram of a portion of a further specific embodiment of an artificial neural network according to the present invention. According to this specific embodiment, the artificial neural network or the method according to the present invention is operated in a so-called "function mode" 400.

The input data of function mode 400 include, in addition to input tensor 310, also division function (slice) 420. Division function (slice) 420 is applied to input tensor 310 to obtain a first slice tensor 330 and a second slice tensor 350. In contrast to "tensor mode" 300, an arbitrary function of an artificial neural network 421, 422 is additionally applied to first slice tensor 330 and to second slice tensor 350. Convolution, residual value (residual), density (dense), inception, activation (act), normalization, compilation (pooling) or the like are, among others, possible. Different functions of an artificial neural network 421, 422 may be applied to first slice tensor 330 and to second slice tensor 350.

Thereafter, first slice tensor 330 is supplied to decoder path 340 of the artificial neural network, in order to be linked there with coarse, abstract feature representations.

The at least one second slice tensor 350, together with the at least one first slice tensor 330, is supplied to a connecting function (merge) 360 to generate an output tensor 370. Any rule which is suitable for connecting first slice tensor 330 to second slice tensor 350 may be applied as a connecting function (merge) 360. Concatenation, summation, substitution, replication or the like are, among others, possible. Output tensor 370 is provided to be processed further along encoder path 380 by the artificial neural network.

Figure 5:
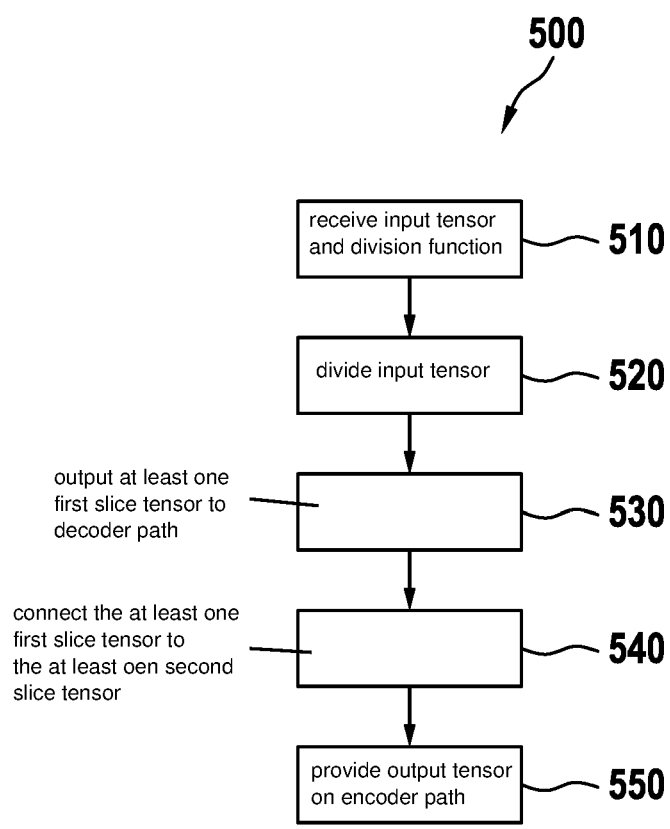
FIG. 5 shows a flowchart of the method according to an example embodiment of the present invention.

FIG. 5 shows a flowchart of the method according to the present invention.

Step 510 is shown by a dotted line. It indicates that step 510 shall be regarded as an optional step. In step 510, input tensor 310 and a division function 320, 420 are received.

In step 520, input tensor 310 is divided into at least one first slice tensor 330 and at least one second slice tensor 350 as a function of division function 320, 420, input tensor 310 being dependent on image data 111, 211.

If optional step 510 does not take place, division function 320, 430 is predefined, and input tensor 310 is present as an input datum of the method.

In step 530, the at least one first slice tensor 330 is output to decoder path 120, 220 of the neural network. In decoder path 120, 220, the at least one first slice tensor 330 may be linked with a coarse, abstract feature representation.

In step 540, the at least one first slice tensor 320 is connected to the at least one second slice tensor 350 as a function of a connecting function (merge) 360 to obtain an output tensor 370. Output tensor 370 is provided to be processed on encoder path 110, 210 of the artificial neural network.

In step 550, output tensor 370 is output to encoder path 110, 210 of the neural network to be further processed by the artificial neural network.

The present invention is preferably suited for use in an automotive system, in particular, in connection with driver assistance systems up to semi-automated or fully automated driving.

Of particular interest in the process is the processing of image data or image streams which represent the surroundings of a vehicle.

Such image data or image streams may be detected by imaging sensors of a vehicle. The detection in this process may take place with the aid of a single sensor. The merging of image data or image streams of multiple sensors, if necessary, from multiple sensors using different detection technologies, such as for example video, radar, ultrasonic, LIDAR sensors, is possible.

In the process, the ascertainment of free spaces (free space detection) and the semantic distinction of foreground and background in the image data or image streams takes on particular importance.

These features may be ascertained by processing image data or image streams using an artificial neural network according to the present invention. Based on this information, it is possible to accordingly activate the control system for the vehicle longitudinal or lateral control, so that the vehicle may be activated to appropriately respond to the detection of these features in the image data or image streams.

Another field of application of the present invention may be viewed as carrying out an accurate pre-labeling of image data or image data streams for a camera-based vehicle control system.

In the process, the identifiers (labels) to be assigned represent object classes which are to be recognized in image data or image streams.

The present invention is furthermore usable in all fields, for example, automotive, robotics, health, monitoring, etc., which require an exact pixel-based object recognition (pixel-wise prediction) with the aid of artificial neural networks. By way of example, the following may be mentioned: optical flow, depth from single image data, numbers, border recognition, key cards, object detection, etc.

What is claimed is:

1. A method for computing and memory resource-conserving semantic segmentation of image data of an imaging sensor using an artificial neural network, the artificial neural network including an encoder path and a decoder path, comprising the following steps:
dividing an input tensor into at least one first slice tensor and at least one second slice tensor as a function of a division function, the input tensor being dependent on the image data;
outputting the at least one first slice tensor to the decoder path of the artificial neural network;
connecting the at least one first slice tensor to the at least one second slice tensor as a function of a connecting function to obtain an output tensor; and
outputting the output tensor to the encoder path of the neural network.

2. The method as recited in claim 1, wherein the artificial neural network is a convolutional neural network.

3. The method as recited in claim 1, wherein, in the step of dividing, the division function is configured in such a way that only a subset of feature maps of the input tensor is selected for forming the at least one first slice tensor.

4. The method as recited in claim 1, wherein the connecting function is configured in such a way that a dimension of the input tensor is maintained.

5. The method as recited in claim 1, further comprising a preceding step of receiving, the input tensor and the division function being received in the step of receiving.

6. The method as recited in claim 1, wherein, in the step of dividing, a first function of a neural network is applied to the at least one first slice tensor, and a second function of a neural network is applied to the at least one second slice tensor.

7. The method as recited in claim 6, wherein the division function is configured in such a way that it includes the number of feature maps to be computed and respective functions of an artificial neural network for computing the at least one first slice tensor and the at least one second slice tensor.

8. An artificial neural network, for the semantic segmentation of image data of an imaging sensor, the artificial neural network including an encoder path for classification of the image data and a decoder path for localization of the image data, the artificial neural network configured to:
divide an input tensor into at least one first slice tensor and at least one second slice tensor as a function of a division function, the input tensor being dependent on the image data;
output the at least one first slice tensor to the decoder path of the artificial neural network;
connect the at least one first slice tensor to the at least one second slice tensor as a function of a connecting function to obtain an output tensor; and
output the output tensor to the encoder path of the neural network.

9. The artificial neural network as recited in claim 8, wherein the artificial neural network is a convolutional neural network.

10. A device including an artificial neural network for the semantic segmentation of image data of an imaging sensor, the artificial neural network including an encoder path for classification of the image data and a decoder path localization of the image data, the device configured to:
divide an input tensor into at least one first slice tensor and at least one second slice tensor as a function of a division function, the input tensor being dependent on the image data;
output the at least one first slice tensor to the decoder path of the artificial neural network;

connect the at least one first slice tensor to the at least one second slice tensor as a function of a connecting function to obtain an output tensor; and output the output tensor to the encoder path of the neural network.

11. A non-transitory machine-readable memory medium on which is stored a computer program for computing and memory resource-conserving semantic segmentation of image data of an imaging sensor using an artificial neural network, the artificial neural network including an encoder path and a decoder path, the computer program, when executed by a computer, causing the computer to perform the following steps:

dividing an input tensor into at least one first slice tensor and at least one second slice tensor as a function of a division function, the input tensor being dependent on the image data;

outputting the at least one first slice tensor to the decoder path of the artificial neural network;

connecting the at least one first slice tensor to the at least one second slice tensor as a function of a connecting function to obtain an output tensor; and outputting the output tensor to the encoder path of the neural network.

\* \* \* \* \*